United States Patent
Behrendt

Patent Number: 5,687,482
Date of Patent: Nov. 18, 1997

[54] ROTATING TRIMMING LINE FOR BRUSH CUTTERS

[75] Inventor: Martin Behrendt, Hamburg, Germany

[73] Assignee: Dolmar GmbH, Hamburg, Germany

[21] Appl. No.: 512,606

[22] Filed: Aug. 8, 1995

[30] Foreign Application Priority Data

Aug. 11, 1994 [DE] Germany ............... 94 12 925.8

[51] Int. Cl.⁶ ............... A01D 55/00; B26B 27/00
[52] U.S. Cl. ............... 30/276; 30/347; 428/399; 56/295
[58] Field of Search ............... 30/347, 276; 56/289, 56/295, 12.7; 428/369, 371, 397, 399, 400

[56] References Cited

U.S. PATENT DOCUMENTS

| | | | |
|---|---|---|---|
| 4,186,239 | 1/1980 | Mize et al. | 428/399 |
| 4,265,019 | 5/1981 | Kilmer | 30/376 |
| 4,869,055 | 9/1989 | Mickelson | 56/12.7 |
| 4,905,465 | 3/1990 | Jones et al. | 56/295 |
| 5,220,774 | 6/1993 | Harbeke et al. | 56/12.7 |
| 5,424,128 | 6/1995 | Fogle | 428/399 |
| 5,463,815 | 11/1995 | Fogle | 30/376 |

FOREIGN PATENT DOCUMENTS

1 572 030  7/1980  United Kingdom .

Primary Examiner—Hwei-Siu Payer
Attorney, Agent, or Firm—Townsend and Townsend and Crew LLP

[57] ABSTRACT

In order to provide a rotating trimming line (10) for brush cutters (100) equipped with a driving motor (119) which sets the rotating trimming line (10) that is clampingly secured with one end (13) into rotational movement, in which case the rotating trimming line (10), by virtue of the centrifugal force, extends essentially toward the outside and the rotating trimming device (10) is constructed in such a way that, in relation to its longitudinal axis (L), it possesses a varying position of the cross-section, with which, even at a high speed of rotation or at a high number of revolutions per unit time of the rotating trimming line, a substantial noise reduction can be achieved in comparison with the known rotating trimming line embodiments, which is simple to manufacture and which possesses a great stability, it is proposed that the rotating trimming line (10) possesses a radially symmetrical, viz. a polygonal, cross-section (Q, Q1, Q2, Q3), that the cross-section (Q, Q1, Q2, Q3), in relation to the longitudinal axis (L), is constant and that the position of the cross-section, in relation to the longitudinal axis (L), varies continuously by a constant angular amount per unit of length of the longitudinal axis (L).

6 Claims, 2 Drawing Sheets

ROTATING TRIMMING LINE FOR BRUSH CUTTERS

The present invention sets out from a rotating trimming line for brush cutters with a driving motor that sets the rotating trimming line which is clampingly attached with one end into rotation, wherein the rotating trimming line extends essentially radially outward by virtue of the centrifugal force and wherein the rotating trimming line is constructed in such a way that, relative to its longitudinal axis, it posssesses a varying position of the cross-section.

BACKGROUND OF THE INVENTION

In brush cutters, the rotating trimming line is caused to rotate at a high rotational velocity of up to ten thousand revolutions a minute, which leads to a considerable noise generation when brush cutters are in operation. In order to resolve this problem, the most widely varied proposals have already been put forward.

Thus, from the U.S. Pat. No. 4,186,239, a filament is known which is comprised of nylon and possesses a substantially round or elliptical cross-section while, on the surface area of the filament, a large number of notches proceeding transversally to the longitudinal axis are disposed. In another embodiment, a filament is provided which is comprised of two or more filament members that are interconnected at their longitudinal axis or which are combined so as to form a stellate profile. These embodiments of cutting filaments possess a cross-section which is totally radially symmetrical. The notches extending relative to the longitudinal axis are intended to prevent a fraying of the nylon filament, that is to say that the notches represent breakaway edges on the free end of the cutting filament.

From the EP-A-0 260 158, various embodiments of a cutting line are known, in which all the proposed cross-sections are radially symmetrical and possess either a stellate configuration or that of a constricted curved square.

From the DE 40 05 879 C1, a cutting line is known which, in relation to its longitudinal axis, possesses a varying position of its cross-section, in which case, according to the invention, provision is made there for the cutting line to possess a cross-section which diverges from the radial symmetry, viz. a radially non-symmetrical one. For this, the cutting line, on the surface area of its basic body forming almost the entire cross-section of the cutting line, is provided with at least one groove or raised portion extending in a helical fashion, in which case the groove or the raised portion extends without interruption with a constant depth or height and width along the helix. Such a cutting line still produces considerable vexatious noise emissions, which are due to the formation of air vortices and air vortices separation on the cutting line rotating at a high angular velocity. In addition, the fabrication is costly and the stability is unsatisfactory owing to the occurring notch effect.

That is why the technical effect of the present invention is to provide a rotating trimming line of the type stated in the beginning, in which a substantial noise reduction can be achieved compared with the known rotating trimming line embodiments even at a high speed of rotation or revolution of the trimming line, which is simple to construct and possesses a high degree of stability.

SUMMARY OF THE INVENTION

This technical problem is resolved by means of the features stated in the claim 1.

The central idea in the new embodiment consists in that the rotating trimming line possesses a radially symmetrical cross-section.

This radially symmetrical, preferably square, cross-section is maintained constant over the entire longitudinal axis so that, in each sectional plane, a uniform cross-section of the rotating trimming line exists. However, according to the invention, the location of the cross-section relative to the longitudinal axis varies continuously by a specific angular amount per unit of length. In a square cross-section, this results in the rotating trimming line not possessing a classic profile, but that the four edges extend helically.

It has been shown that it is possible to combine the most widely varying advantages by means of such a configuration of a rotating trimming line since, by means of such a configuration the flow resistance is diminished, the noise emission is reduced, the rotational speed of the tool is increased with the same performance, a more uniform operation on the plane of rotation (i.e. without any deflection of the rotating trimming line) is achieved, the rotating trimming line is better circumcirculated by air.

A further advantage consists in that the resistance to wear is not reduced by depressions or notches, as is the case with rotating trimmer devices provided with grooves or stellate profiles.

It has been shown furthermore that it also has a significant influence upon the positive properties of the rotating trimming line by what angular amount per unit of length the location of the cross-section varies. In this connection it has been shown that a variation of an angular amount per unit of length of the longitudinal axis of the rotating trimming line of approximately 18 mm yields particularly advantageous results. Such a trimming line is produced by torsion or twisting, the fabrication being effected in such a way that the cross-section is retained. In order to express the degree of twisting, the following designation and unit was established:

Designation: degree of twisting

Unit: twistings per meter (t/m).

A degree of twisting in the order of magnitude of 20 t/m means that the rotating trimming line, over one meter, is twisted through 360° about its longitudinal axis. As already stated in the foregoing, tests involving different degrees of twisting have resulted in showing that a rotating trimming line having a pertinent degree of twisting of 50 t/m possesses the most advantageous properties.

It has shown itself to be advantageous to fabricate the rotating trimming line, which is comprised of thermoplastic material, in that it is first clampingly secured, then twisted and subsequently permanently deformed by heat being supplied. The advantage consists in that the rotating trimming line cross-section is retained over the entire longitudinal axis, which is not the case in a design possessing e.g. notches or depressions. Moreover, it has been shown that, by virtue of the less substantial noise emission, the rotating trimming line can be employed to better advantage from environment-related standpoints and from an angle regarding the protection at work. Over and above that it is additionally possible to achieve a higher rotational tool speed and, thereby, a greater cutting performance.

Advantageous constructions and further developments of the invention are characterized in the subclaims.

BRIEF DESCRIPTION OF THE DRAWINGS

An embodiment example of the brush cutter according to the invention is explained in greater detail below with the aid of the drawings. Thus

DETAILED DESCRIPTION OF THE PREFERRED EMBODIMENT

Figure 1:
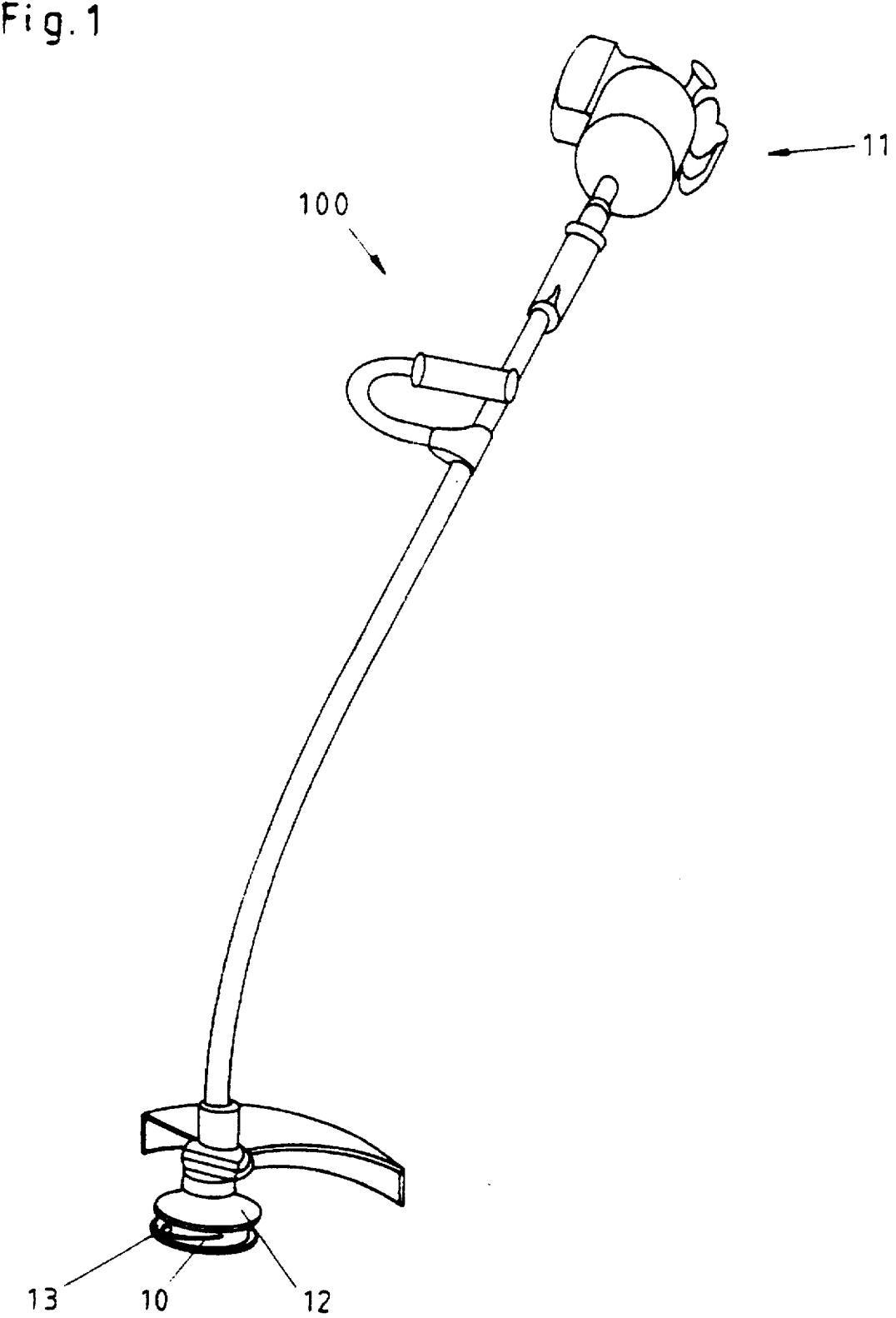
FIG. 1 shows in a diagrammatical view a brush cutter in a schematic representation.

In FIG. 1, a brush cutter 100 is depicted, in which the rotating trimming line 10 is set into rotation by means of a driving motor 11, in which case the rotating trimming line 10 is clampingly attached to a rotating part 12 with one end 13 so that the rotating trimming line 10, when the rotating part 12 is in rotation, extends essentially toward the outside.

Figure 2:
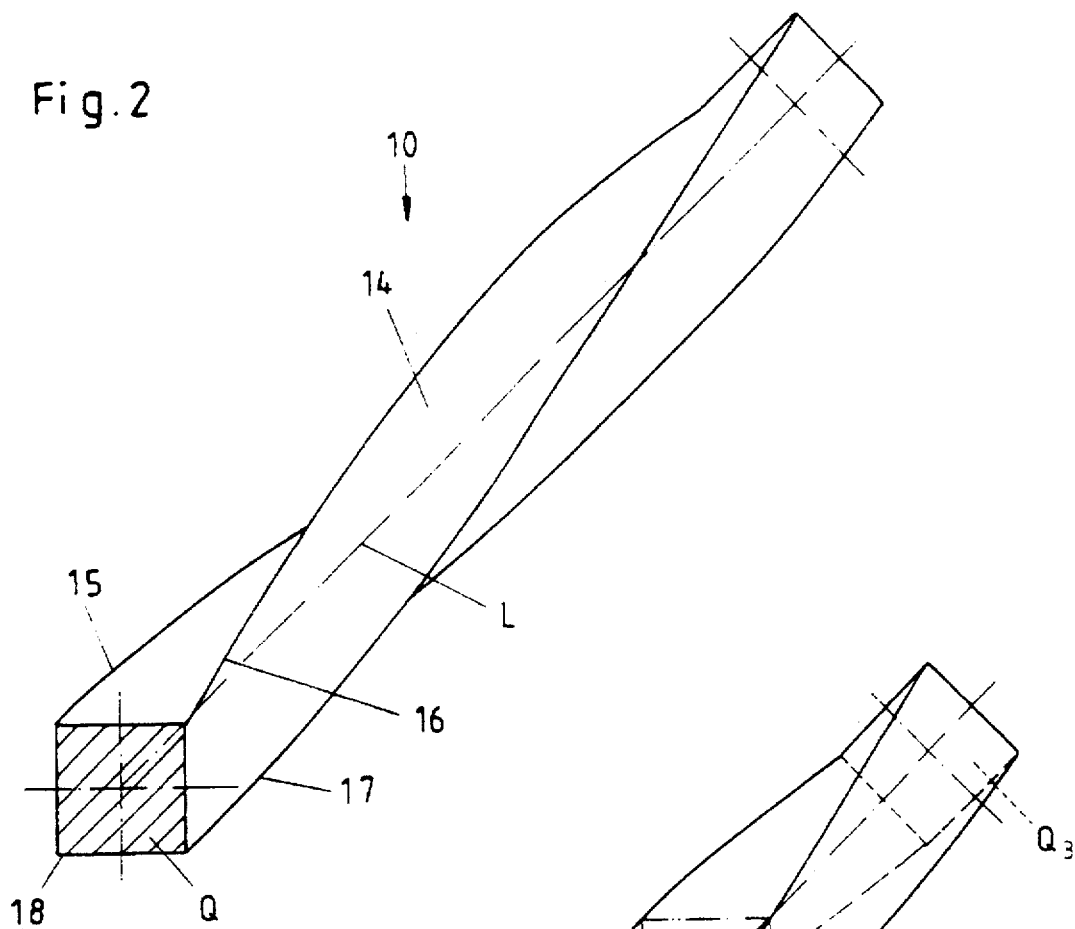
FIG. 2 shows in a diagrammatical longitudinal view a rotating trimming line.
Figure 3:
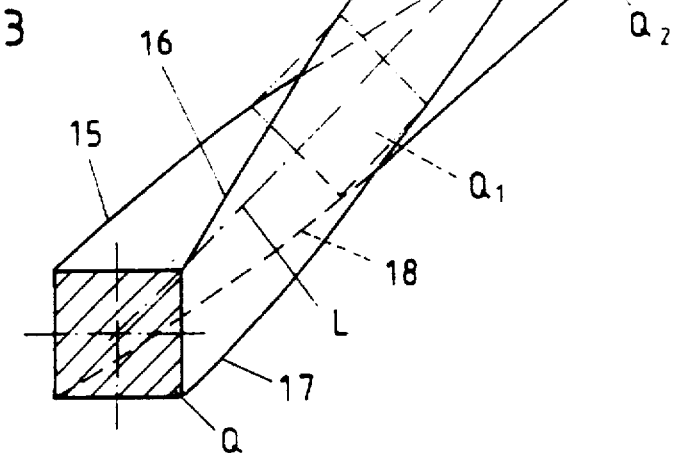
FIG. 3 shows the rotating trimming line according to FIG. 2 with indicated cross-sectional representations.

In the FIGS. 2 and 3, a section 14 of the rotating trimming line 10 is depicted purely schematically in an enlarged representation, from which the construction according to the invention of the rotating trimming line is more clearly discernible. The rotating trimming line itself possesses a square cross-sectional configuration Q, which, in relation to the longitudinal axis L, is constant. According to the invention provision is made, however, for the cross-sectional configuration Q not to vary along the longitudinal axis, it is true, but for it to be positionally varied by a certain angular amount. This is indicated in FIG. 3, where the cross-section Q1 rotated through 45° and the cross-section Q2 rotated through 90° as well as the cross-section Q3 rotated through 135° are emphasized.

By the twisting of the cross-sectional configuration and, thereby, the twisting of the rotational trimming line 10, it results that the lateral edges 15, 16, 17, 18 revolve helically about the longitudinal axis L. Since the position of the cross-sectional configuration Q, in relation to the longitudinal axis L, varies by an amount of approximately 18°/mm, the helical lines run once around the rotating trimming line over a length of 20 mm.

| List of Reference Numbers | |
|---|---|
| Brush cutter | 100 |
| rotating trimmer | 10 |
| driving motor | 11 |
| rotating part | 12 |
| trimming line end | 13 |
| section | 14 |
| cross-section | Q, Q1, Q2, Q3 |
| longitudinal axis | L |
| lateral edges | 15, 16, 17, 18. |

What is claimed is:

1. A brush cutter comprising:

a drive motor; and a rotating trimming line having a first end secured to the drive motor for rotational movement of the trimming line, the trimming line having a longitudinal axis and a plurality of lateral edges with lateral surfaces therebetween, the lateral surfaces each defining a smooth surface along the longitudinal axis of the trimming line;

wherein the rotational trimming line has a radially symmetric cross-section having a constant size and shape along the longitudinal axis, the angle of the cross section relative to the longitudinal axis varying continuously by a constant amount along the longitudinal axis of the trimming line.

2. The brush cutter of claim 1 wherein the lateral edges of the trimming line each extend helically along the longitudinal axis.

3. The brush cutter of claim 1 wherein the angle of the cross-section relative to the longitudinal axis varies by approximately 18 degrees per mm.

4. The brush cutter of claim 1 wherein the cross-section of the trimming line twists about 50 times per meter along the longitudinal axis of the trimming line.

5. The brush cutter of claim 1 wherein the trimming line comprises a thermoplastic material.

6. The brush cutter of claim 1 wherein the trimming line comprises a square cross-section.

* * * * *